(12) United States Patent
Lippincott (10) Patent No.: US 7,236,648 B2
(45) Date of Patent: Jun. 26, 2007

(54) SCALING IMAGES FOR DISPLAY (75) Inventor: Louis A. Lippincott, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 10/828,829

(22) Filed: Apr. 20, 2004

(65) Prior Publication Data
US 2005/0117815 A1 Jun. 2, 2005

Related U.S. Application Data (63) Continuation of application No. 09/472,545, filed on Dec. 27, 1999, now Pat. No. 6,724,948.

(51) Int. Cl.
G06K 9/32 (2006.01)
G06G 5/00 (2006.01)
H04N 9/74 (2006.01)

(52) U.S. Cl. ............... 382/298; 345/660; 348/581
(58) Field of Classification Search ............... None
See application file for complete search history.

(56) References Cited

U.S. PATENT DOCUMENTS

| 4,908,697 | A | * | 3/1990 | Tsinberg et al. ....... 375/240.25 |
| 4,992,853 | A | * | 2/1991 | Cavallerano ............. 348/437.1 |
| 5,594,467 | A | * | 1/1997 | Marlton et al. ............. 345/641 |
| 5,694,149 | A | * | 12/1997 | Cahill, III ............... 345/667 |
| 5,710,573 | A | * | 1/1998 | Hung et al. ............. 345/634 |
| 5,764,807 | A | | 6/1998 | Pearlman et al. |
| 5,831,592 | A | | 11/1998 | Cahill, III |
| 6,028,586 | A | * | 2/2000 | Swan et al. ............. 345/581 |
| 6,122,433 | A | * | 9/2000 | McLaren ............. 386/68 |
| 6,144,412 | A | | 11/2000 | Hirano et al. |
| 6,327,000 | B1 | | 12/2001 | Auld et al. |
| 6,347,154 | B1 | * | 2/2002 | Karanovic et al. ......... 382/233 |
| 6,353,459 | B1 | * | 3/2002 | Yeh et al. ............... 348/441 |
| 6,611,260 | B1 | * | 8/2003 | Greenberg et al. ......... 345/204 |

* cited by examiner

Primary Examiner—Wenpeng Chen
(74) Attorney, Agent, or Firm—Fish & Richardson P.C.

(57) ABSTRACT

A graphic image that has pixels arranged in rows and columns is scaled by processing a succession of segments. Each segment comprises contiguous pixels. The row and column dimensions of each segment do not correspond to an intended degree of scaling in both dimensions. The processing of each segment produces an intermediate pixel. The intermediate pixels form a stream. The intermediate stream of pixels is processed to form a final two-dimensional scaled image.

14 Claims, 13 Drawing Sheets

|    | Signal | Description |
|----|--------|-------------|
|    |        | Clock and Reset Interface |
|    | HVS_Reset | Hardware Vertical Scaler reset |
|    | HVS_Clk | Hardware Vertical Scaler main clock |
|    |        | Memory Interface |
| 78 | Fetch_Ready | Source input image data is available (from Memory Controller) |
| 78 | Fetch_Data[31:0] | Source input image data (from Memory Controller) |
|    |        | Register and Command Interface |
| 60 | Start_Y_Cmnd | Command to start the processing of the Y plane of pixels |
| 66 | Y_Addr[31:3] | Upper 29 bits of the source Y image byte address |
| 68 | Y_Pitch[14:3] | Amount to add to the address to locate the next line's Y pixels |
| 70 | Y_Length[10:0] | Number of lines in the source input Y image plane |
| 72 | Y_Width[11:0] | Number of Y pixels (x4) in one line of the source image |
| 62 | Start_U_Cmnd | Command to start the processing of the U plane of pixels |
| 66 | U_Addr[31:3] | Upper 29 bits of the source U image byte address |
| 68 | U_Pitch[14:3] | Amount to add to the address to locate the next line's U pixels |
| 70 | U_Length[10:0] | Number of lines in the source input U image plane |
| 72 | U_Width[11:0] | Number of U pixels (x4) in one line of the source image |
| 64 | Start_V_Cmnd | Command to start the processing of the V plane of pixels |
| 66 | V_Addr[31:3] | Upper 29 bits of the source V image byte address |
| 68 | V_Pitch[14:3] | Amount to add to the address to locate the next line's V pixels |
| 70 | V_Length[10:0] | Number of lines in the source input V image plane |
| 72 | V_Width[11:0] | Number of V pixels (x4) in one line of the source image |
|    |        | Filter Interface |
|    | Filter_Ready | Filter block is ready to accept pixels from the IPFB |

IPFB Input Table

FIG. 9

Output Table

| | Signal | Description |
|---|---|---|
| | | Memory Interface |
| 78 | Fetch_Req | Request to the memory interface for the source image |
| 78 | Fetch_Addr[31:3] | Upper 29 bits of the source image current byte address |
| | | Register and Command Interface |
| 74 | Y_Done | The IPFB has sent the last pixel segment of the Y image to the PFB |
| 74 | U_Done | The IPFB has sent the last pixel segment of the U image to the PFB |
| 74 | V_Done | The IPFB has sent the last pixel segment of the V image to the PFB |
| | | Filter Interface |
| 76 | Column_Done | The last pixel of the current column is being sent to the Filter Block |
| | Filter_Req | Request to send the next set of pixels to the Filter Block |
| | Filter_Data[31:0] | The pixel data to the Filter Block |

Input Table

| Signal | Description |
|---|---|
| | Clock and Reset Interface |
| HVS_Reset | Hardware Vertical Scaler reset |
| HVS_Clk | Hardware Vertical Scaler main clock |
| | Input Pixel Formatting Block (IPFB) Interface |
| Y_Done | The IPFB has sent the last pixel segment of the Y image to the PFB |
| U_Done | The IPFB has sent the last pixel segment of the U image to the PFB |
| V_Done | The IPFB has sent the last pixel segment of the V image to the PFB |
| Column_Done | The last pixel of the current column is being sent to the Filter Block |
| Filter_Req | Request to input the next set of pixels to the Filter Block |
| Filter_Data[31:0] | The pixel data to the Filter Block |
| | Output Pixel Formatting Block (OPFB) Interface |
| Scaled_Ready | OPFB is ready to accept pixels from the PFB |
| | Register and Command Interface |
| CRAM_Write | Write command to the CRAM port |
| CRAM_Addr[5:0] | CRAM Address for programming coefficients |
| CRAM_Data[6:0] | Seven bit CRAM coefficient data |
| DDA_Write | Write command to the DDA port |
| DDA_Addr[3:0] | DDA Function Address for programming DDA behavior |
| DDA_Data[31:0] | DDA data |

80 — Y_Done
82 — U_Done
84 — V_Done

FIG. 12

Output Table

| Signal | Description |
|---|---|
| | Input Pixel Formatting Block (IPFB) Interface |
| Filter_Ready | Filter block is ready to accept pixels from the IPFB |
| | Output Pixel Formatting Block (OPFB) Interface |
| Scaled_Req | Request to transfer data from PFB to OPFB |
| Scaled_Data[31:0] | Scaled output image data from Pixel Filter Block |

Input Table

| | Signal | Description |
|---|---|---|
| | | Clock and Reset Interface |
| | HVS_Reset | Hardware Vertical Scaler reset |
| | HVS_Clk | Hardware Vertical Scaler main clock |
| | | Memory Interface |
| 116 | Store_Ready | Memory Controller can accept output image data |
| | | Register and Command Interface |
| 106 | Y_Addr[31:3] | Upper 29 bits of the scaled Y image destination byte address |
| 108 | Y_Pitch[14:3] | Amount to add to the address to locate the next line's Y pixels |
| 110 | Y_Length[10:0] | Number of lines in the scaled output Y image plane |
| 112 | Y_Width[11:0] | Number of Y pixels (x4) in one line of the scaled image |
| 106 | U_Addr[31:3] | Upper 29 bits of the scaled U image destination byte address |
| 108 | U_Pitch[14:3] | Amount to add to the address to locate the next line's U pixels |
| 110 | U_Length[10:0] | Number of lines in the scaled input U image plane |
| 112 | U_Width[11:0] | Number of U pixels (x4) in one line of the scaled image |
| 106 | V_Addr[31:3] | Upper 29 bits of the scaled V image destination byte address |
| 108 | V_Pitch[14:3] | Amount to add to the address to locate the next line's V pixels |
| 110 | V_Length[10:0] | Number of lines in the scaled input V image plane |
| 112 | V_Width[11:0] | Number of V pixels (x4) in one line of the scaled image |
| | | Filter Interface |
| 100 | Store_Y | The Pixel Filter Block is processing the Y plane of pixels |
| 102 | Store_U | The Pixel Filter Block is processing the U plane of pixels |
| 104 | Store_V | The Pixel Filter Block is processing the V plane of pixels |
| 114 | Scaled_Data[31:0] | Scaled output image data from Pixel Filter Block |
| 114 | Scaled_Req | Request to transfer data from PFB to OPFB |

FIG. 16

Output Table

| | Signal | Description |
|---|---|---|
| | | Memory Interface |
| 116 | Store_Req | Request to the memory interface for the output image data |
| 116 | Store_Data[31:0] | Scaled output image data |
| 116 | Store_Addr[31:3] | Upper 29 bits of the scaled image current byte address |
| | | Filter Interface |
| 114 | Scaled_Ready | OPFB is ready to accept pixels from the PFB |

SCALING IMAGES FOR DISPLAY

CROSS-REFERENCE TO RELATED APPLICATIONS

This application is a continuation application of and claims priority to U.S. patent application Ser. No. 09/472,545, filed Dec. 27, 1999, now U.S. Pat. No. 6,724,948.

BACKGROUND

This invention relates to scaling images for display.

In video images, the number of pixels in an image determines the quality, or resolution, of the image. More pixels in an image translates to higher resolution.

High definition television (HDTV) images, for example, have a high resolution (e.g., 1920×540 1080i (interlaced)) that cannot be directly displayed on a typical personal computer (PC) monitor without scaling the images to a lower resolution (e.g., 1280×720). Additionally, the images typically occupy a small section of the PC monitor, requiring further scaling to a lower resolution (e.g., 480×135).

One way to scale HDTV images to a usable size for PC monitors is by overlay scaling. Overlay scaling reads an HDTV image from the computer's memory and scales it horizontally and vertically. Overlay scales images "on the fly," while the PC monitor is being refreshed. The scaled image replaces ("overlays") the previously scaled image being displayed on the PC monitor. The number of images scaled and displayed per second, e.g., 85 frames per second (85 Hz), enables a computer user to view a continuous video picture sequence on the monitor.

Figures 1, 4:
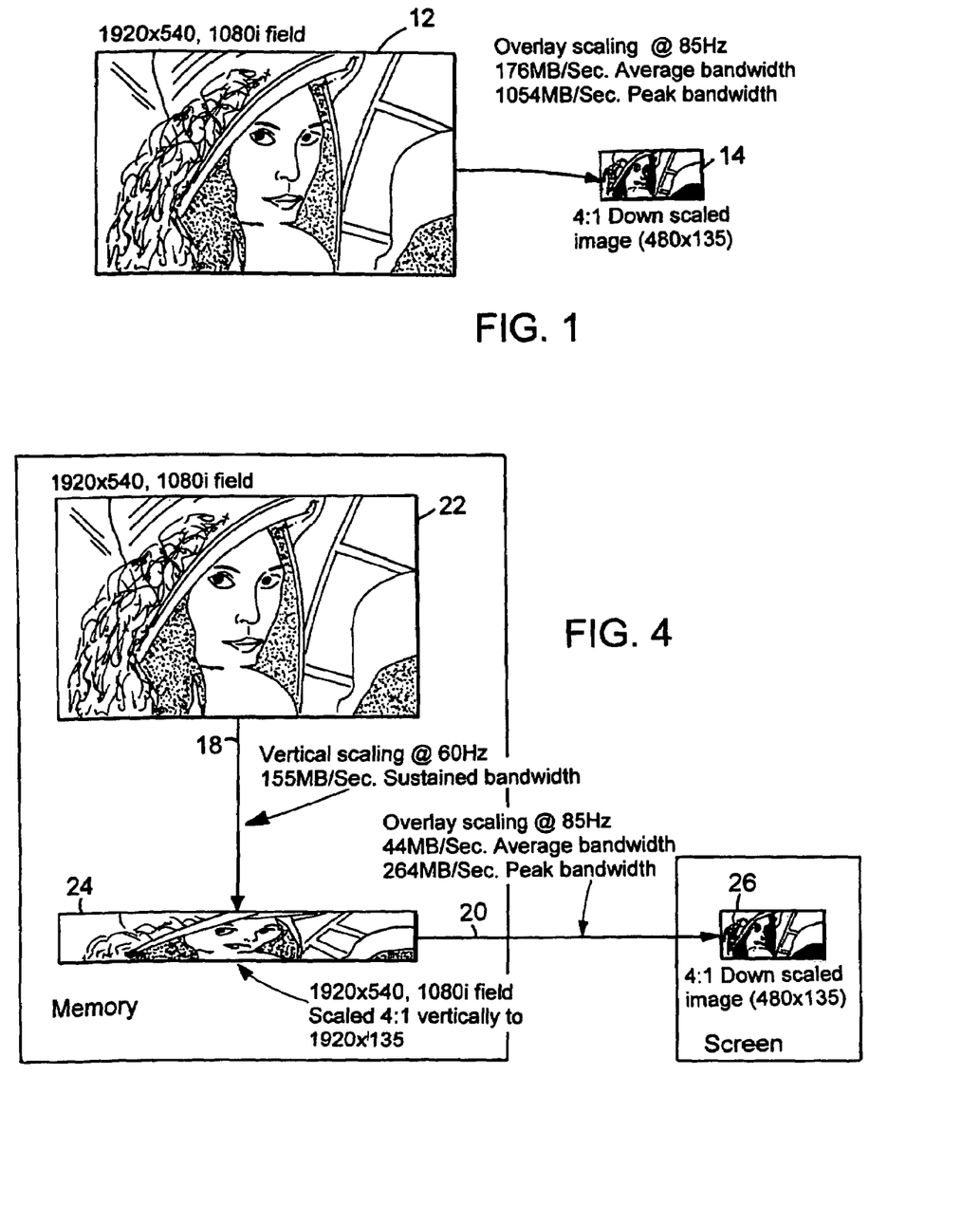
FIG. 1 is a diagram illustrating overlay scaling.
FIG. 4 is a diagram illustrating a two-pass scaling technique.
Figure 2:
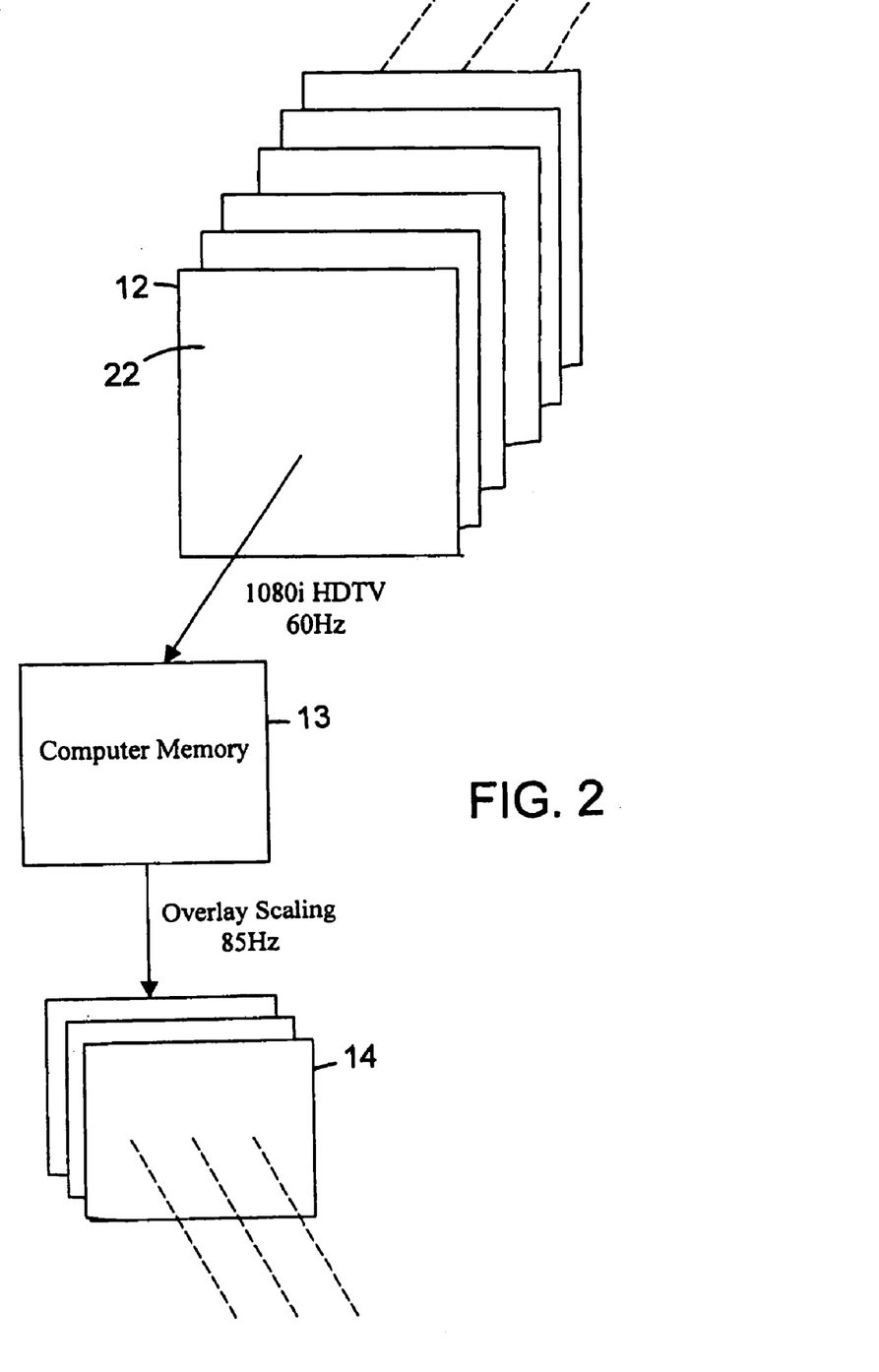
FIG. 2 is a diagram showing video image processing.

For example, in FIG. 1, overlay scaling reads a 1920×540 1080i HDTV image 12 from a PC's memory, creates a 4:1 downscaled 480×135 image 14, and displays the image 14 on the PC's monitor. As seen in FIG. 2, image 12 is one of a sequence of incoming video images that appear at an image update rate of 60 frames per second (60 Hz) and are stored temporarily in memory 13. Because image 12 is interlaced (only every other line of the image is displayed), the "real" update rate is 30 frames per second (30 Hz). The overlay process reads successive images 12 from computer memory 13 at a PC CRT (cathode-ray tube) refresh rate, e.g., 85 frames per second (85 Hz), downscales them, and delivers them to the monitor for display.

Figure 3:
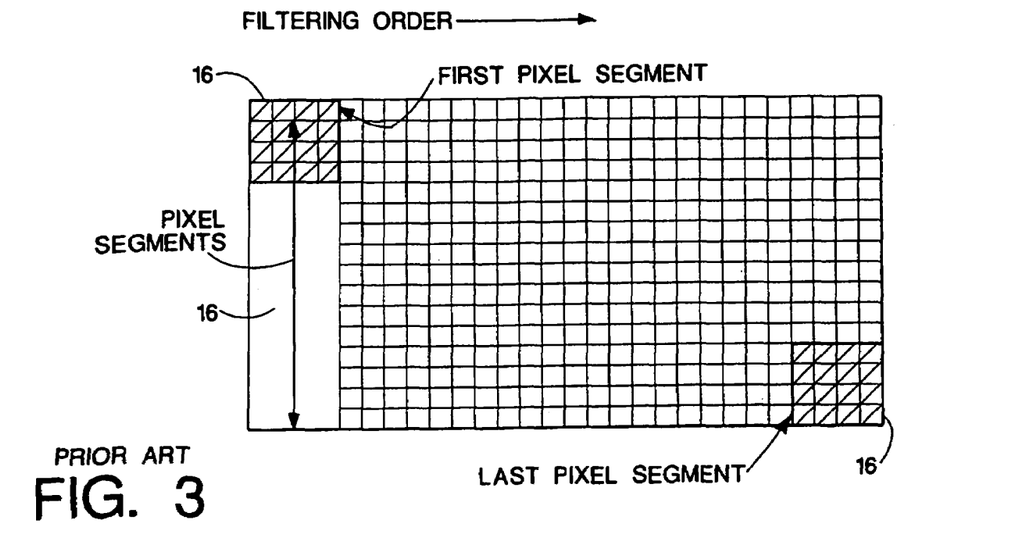
FIG. 3 is a diagram of pixels.

Also referring to FIG. 3, to create the 4:1 downscaled image 14, an overlay process reads sixteen pixels of image 12 (one pixel segment 16), compresses them to form one pixel of image 14, displays the one pixel, and proceeds to the next segment 16. The segments 16 are processed from left to right in each row, working from the top row to the bottom row. This overlay scaling requires an average memory bandwidth of 176 MB/sec, where memory bandwidth equals (horizontal resolution, 1920)×(vertical resolution, 540)×(refresh rate, 85)×(bytes per pixel, 2), and a peak memory bandwidth of 1054 MB/sec (1920×540×85×12). Some PC memory systems cannot supply such a high bandwidth, so the PC compensates by dropping lines of the image. For example, dropping every other line would reduce the bandwidth requirements by 50%. Dropping lines, however, decreases image quality because the information in every pixel should contribute to the downscaled image.

SUMMARY

In general, in one aspect, the invention features scaling a graphic image that has pixels arranged in rows and columns by processing a succession of segments. Each segment comprises contiguous pixels. The row and column dimensions of each segment do not correspond to an intended degree of scaling in both dimensions. The processing of each segment produces an intermediate pixel. The intermediate pixels form a stream. The intermediate stream of pixels is processed to form a final two-dimensional scaled image.

In another aspect, the invention features scaling each image that appears in a video sequence of images for display on a display device that displays downscaled images by compressing each image in a first scaling process to form a sequence of intermediate, partially scaled images, and compressing each of the intermediate images in a second scaling process to form a final sequence of scaled images.

Other advantages and features will become apparent from the following description and from the claims.

BRIEF DESCRIPTION OF THE DRAWINGS

FIG. 9 is a table of inputs to an input pixel formatting block.
FIG. 16 is a table of inputs to an output pixel formatting block.
FIG. 17 is a table of outputs from an output pixel formatting block.

DESCRIPTION

In a specific example shown in FIG. 4, a two-pass scaling technique vertically and horizontally scales a 1920×540 1080i HDTV image 22 stored in memory. A first pass 18 vertically scales the image 22 to a 4:1 vertically scaled 1920×135 image 24. A second pass 20 horizontally scales vertically scaled image 24 to a 4:1 vertically and horizontally scaled 480×135 image 26, the final image (ignoring any deinterlacing processing).

Also referring to FIG. 2, image 22 is one of a sequence of incoming video images that are received at an image update rate, e.g., 60 frames per second (60 Hz), by an HDTV receiving system. Each image 22 in the sequence is downscaled, requiring frequent access to memory 13 (where each image 22 is stored). The total amount of memory that a PC can read in a given period is called memory bandwidth. Passes 18 and 20 use a total memory bandwidth of 199 MB/sec and a peak bandwidth of 264 MB/sec, fitting the capabilities of the typical PC. This peak memory bandwidth is less than the 1054 MB/sec peak memory bandwidth in the FIG. 1 overlay scaling example which exceeds the typical PC's capabilities.

Figure 5:
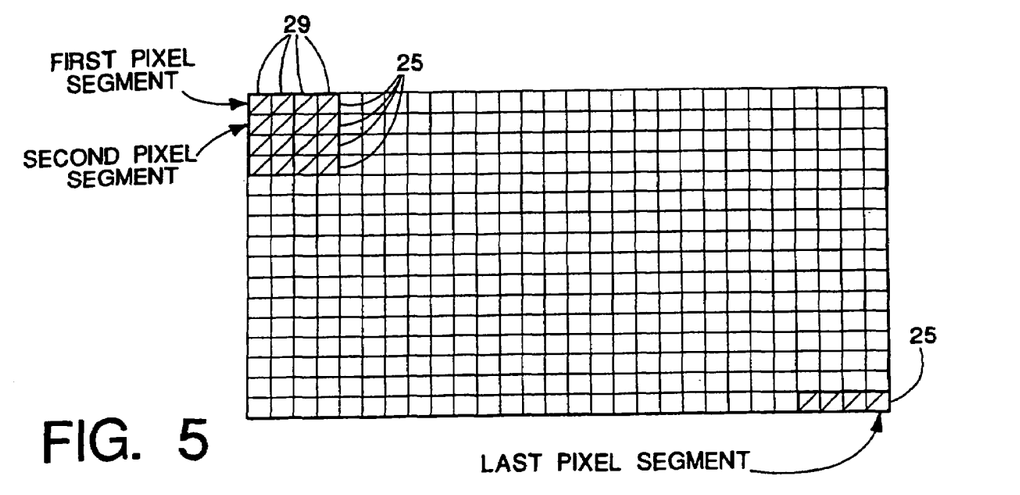
FIG. 5 is a diagram of pixels.

In the first pass 18, image 22 is read from memory 13 at an image update rate, e.g., 60 frames per second (60 Hz). As shown in FIG. 5, to create a vertically scaled image 24, the first pass 18 reads four memory locations to fetch four horizontal pixel segments 25 (each segment having four pixels of image 22). Each horizontal pixel segment 25 includes 32 bits (four pixels of eight bits each) and travels on a 32-bit data bus to a four-tap filter where they await compression. The horizontal pixel segments 25 may vary in size, e.g., eight pixels of eight bits each, to fit on a different sized bus, e.g., 64 bits. With the four horizontal pixel segments 25 stored in the four-tap filter, the first pass 18 compresses four vertical pixel segments 29 (formed from four horizontal pixel segments 25) at the image update rate to form four pixels of vertically scaled image 24. The first pass 18 then proceeds to process the remaining horizontal pixel segments 25 from top to bottom, working from the left column to the right column.

This reading and compressing uses a sustained memory bandwidth of 124 MB/sec, where memory bandwidth equals (horizontal resolution, 1920)×(vertical resolution, 540)×(refresh rate, 60 Hz)×(bytes per pixel, 2). The first pass 18 stores vertically scaled image 24 in memory 13, which uses a sustained memory bandwidth of 31 MB/sec (1920×135× 85×2). Thus, the first pass 18 uses a total sustained memory bandwidth of 155 MB/sec (124 MB/sec+31 MB/sec).

Figure 6:
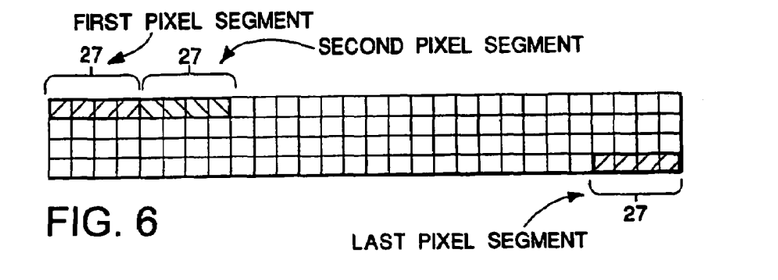
FIG. 6 is a diagram of pixels.

A second pass 20 horizontally scales vertically scaled image 24 to create final image 26 using overlay scaling. In the second pass 20, vertically scaled image 24 is read from memory 13 at a PC CRT refresh rate, e.g., 85 frames per second (85 Hz). As shown in FIG. 6, to create final image 26, the second pass reads a horizontal pixel segment 27 of four pixels of vertically scaled image 24, compresses them at the PC CRT refresh rate to form one pixel of final image 26, and proceeds to the next horizontal segment 27. The horizontal segments 27 are processed from top to bottom, working from the left column to the right column.

The second pass uses an average memory bandwidth of 44 MB/sec (1920×135×85×2) and a peak memory bandwidth of 264 MB/sec (1920×135×85×12). Adding the average memory bandwidths for passes 18 and 20 produces the total memory bandwidth used in the two-pass scaling technique, 199 MB/sec (155 MB/sec+44 MB/sec).

Figure 7:
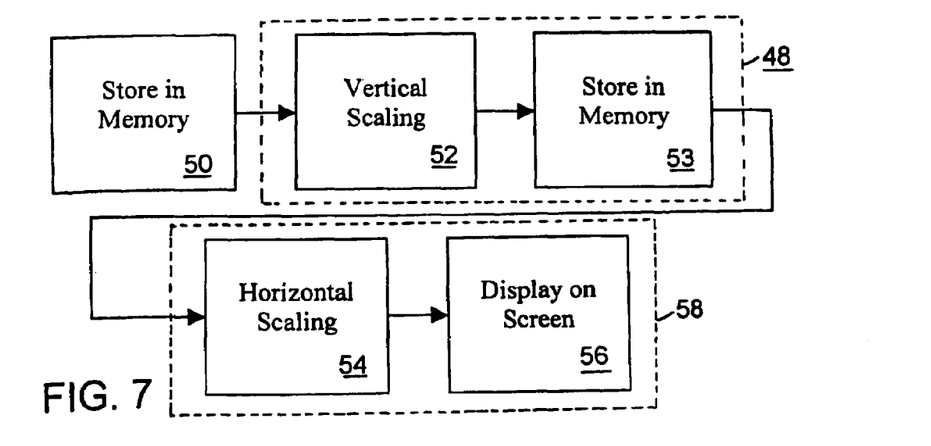
FIG. 7 is a block diagram of a two-pass scaling technique.

Thus, as shown in FIG. 7, in the two-pass scaling technique, an image is stored in memory 50. In a vertical scaling process 48, a vertical scaling function 52 reads the image from memory 50 and scales it vertically. The vertically scaled image is stored back in memory 53. In a horizontal scaling process 58, the second scaling pass, a horizontal scaling function 54 reads the vertically scaled image from memory 53 and scales it horizontally. The result of the horizontal scaling process 58 is displayed on a PC's display screen 56.

Figure 8:
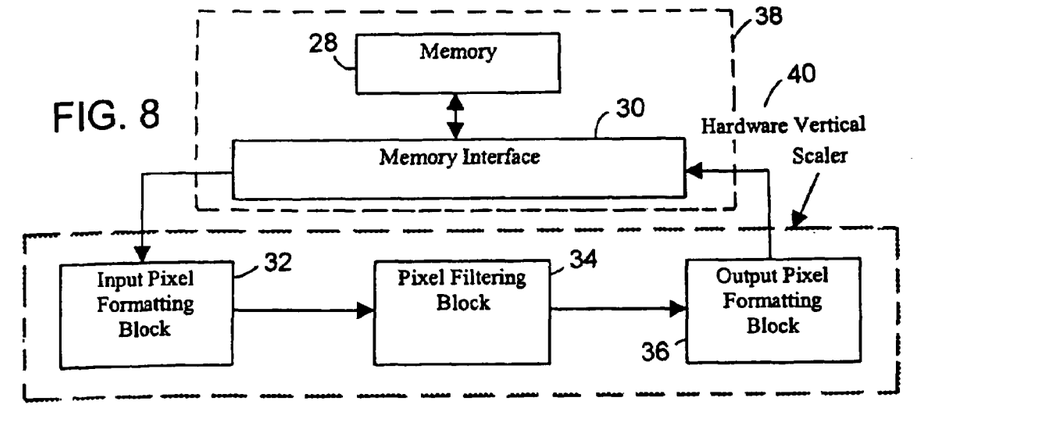
FIG. 8 is a block diagram of a vertical scaling process.

In an example of a structure implementing a vertical scaling process, shown in FIG. 8, an image to be scaled is stored in a memory 28. A memory interface 30 enables other blocks to read and write in memory 28. A hardware vertical scaler 40 vertically scales the image using blocks 32–36.

An input pixel formatting block (IPFB) 32 requests horizontal pixel segments of the image 22 from memory interface 30, generates the addresses required to gather the horizontal pixel segments in the proper sequence, formats them to the expected form, and sends them to the second block, a pixel filtering block (PFB) 34. The PFB 34 filters the vertical pixel segments formed from the horizontal pixel segments as it receives them from the IPFB 32. This filtering affects the vertical scaling, thus making the PFB 34 the key block in the hardware vertical scaler 40. After filtering the pixels, the PFB 34 outputs them to the third block, an output pixel formatting block (OPFB) 36. The OPFB 36 receives pixels from the PFB 34, collects them for rendering back to memory interface 30, and generates the addresses required to assemble the vertically scaled image 24 in memory 30.

Figure 10:
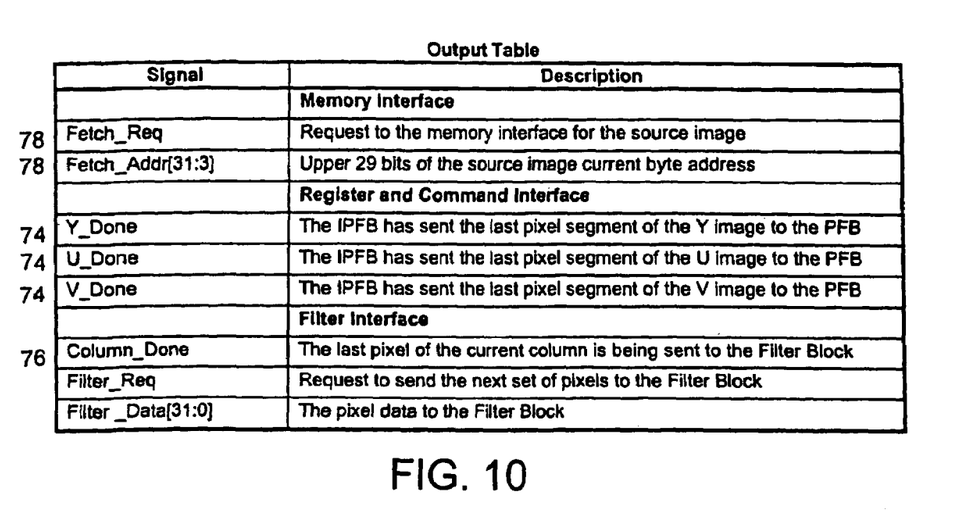
FIG. 10 is a table of outputs from an input pixel formatting block.

The first block in the hardware vertical scaler 40 is the input pixel formatting block (IPFB) 32, implemented as an integrated circuit having inputs as shown in FIG. 9 and outputs as shown in FIG. 10.

Figure 11:
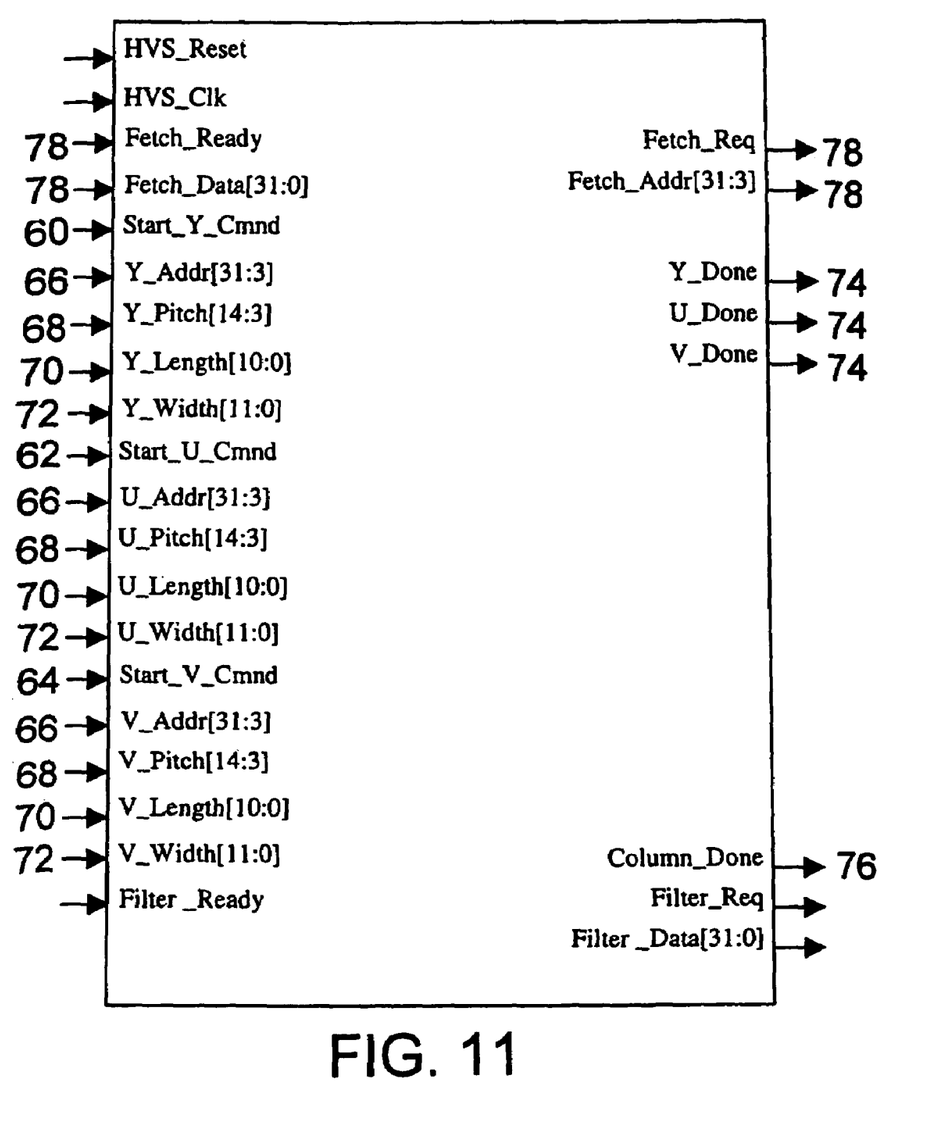
FIG. 11 is a diagram of input and output pins on an input pixel formatting block.

The IPFB 32 starts its operations when it receives a start command(s). As seen in FIG. 11, the IPFB 32 starts when it sees an Off to On transition on at least one of the inputs Start_Y_Cmnd 60 (command to start the processing of the Y (luminance) plane of the pixels), Start_U_Cmnd 62 (command to start the processing of the U (red minus luminance) plane of the pixels), and Start_V_Cmnd 64 (command to start the processing of the V (blue minus luminance) plane of the pixels). Processing occurs in the order of Y, U, then V, so processing begins on the first plane with an active start command. Once active, the start command(s) 60–64 must not be removed until a Done signal 74 is activated.

The start command(s) 60–64 causes the IPFB 32 to start fetching pixels from memory 28 through the memory interface 30, handshaking with the memory interface 30 with fetch inputs and outputs 78, starting at the location indicated by an x_Addr 66 (current address value), where "x" represents Y, U, or V, whichever matches the start command currently being processed. The memory 28 and memory interface 30 are configured so that reading a single memory location fetches, in this example, four contiguous pixels.

Also referring to FIG. 5, four horizontal pixel segments 25 of four pixels of image 22 are read from top to bottom, working from the left column to the right column. Concurrently, a value at an x_Pitch 68, representing the horizontal size of the horizontal pixel segment 25, is added to the x_Addr 66, indicating the address of the next horizontal pixel segment 25. Horizontal pixel segments 25 are so read in columns until the value in an x_Length 70 is met, indicating the end of a column.

After reading a column, the IPFB 32 asserts a Column_Done 76 signal to the PFB 34, and the IPFB 32 resets the x_Addr 66 to point to the top horizontal pixel segment 25 in the next column. The pixel reading so continues until the value in an x_Width 72 is met, indicating that all columns have been read. Once met, an x_Done 74 becomes active, indicating the end of reading the x plane. If its start command is active, the next plane in the sequence (U or V) is processed in the same way. Once all three x_Done 74 signals are active, the IPFB 32 ceases operation until the next start command at any Start_x_Cmnd 60–64.

Therefore, in general what the IPFB 32 does is retrieve horizontal pixel segments 25 (each segment having four pixels for a 4:1 downscaling) of image 22 from memory and present them to the PFB 34 for vertical scaling.

Figure 12:
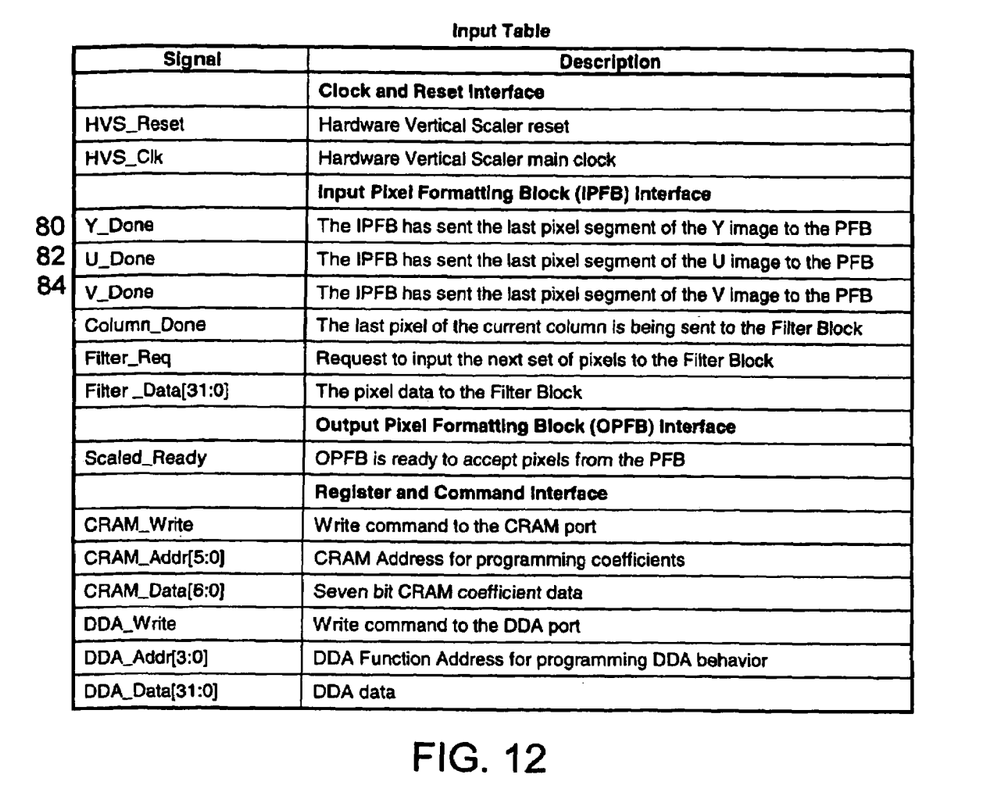
FIG. 12 is a table of inputs to a pixel filtering block.
Figure 13:
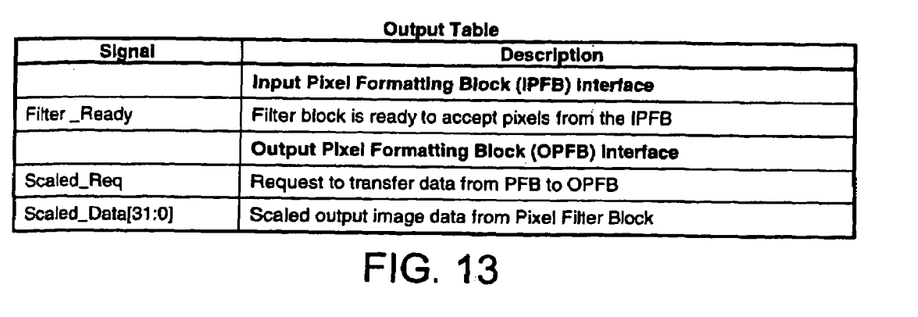
FIG. 13 is a table of outputs from a pixel filtering block.

The second block in the hardware vertical scaler 40 is the PFB 34, implemented as an integrated circuit with inputs as shown in FIG. 12 and outputs as shown in FIG. 13.

Figure 14:
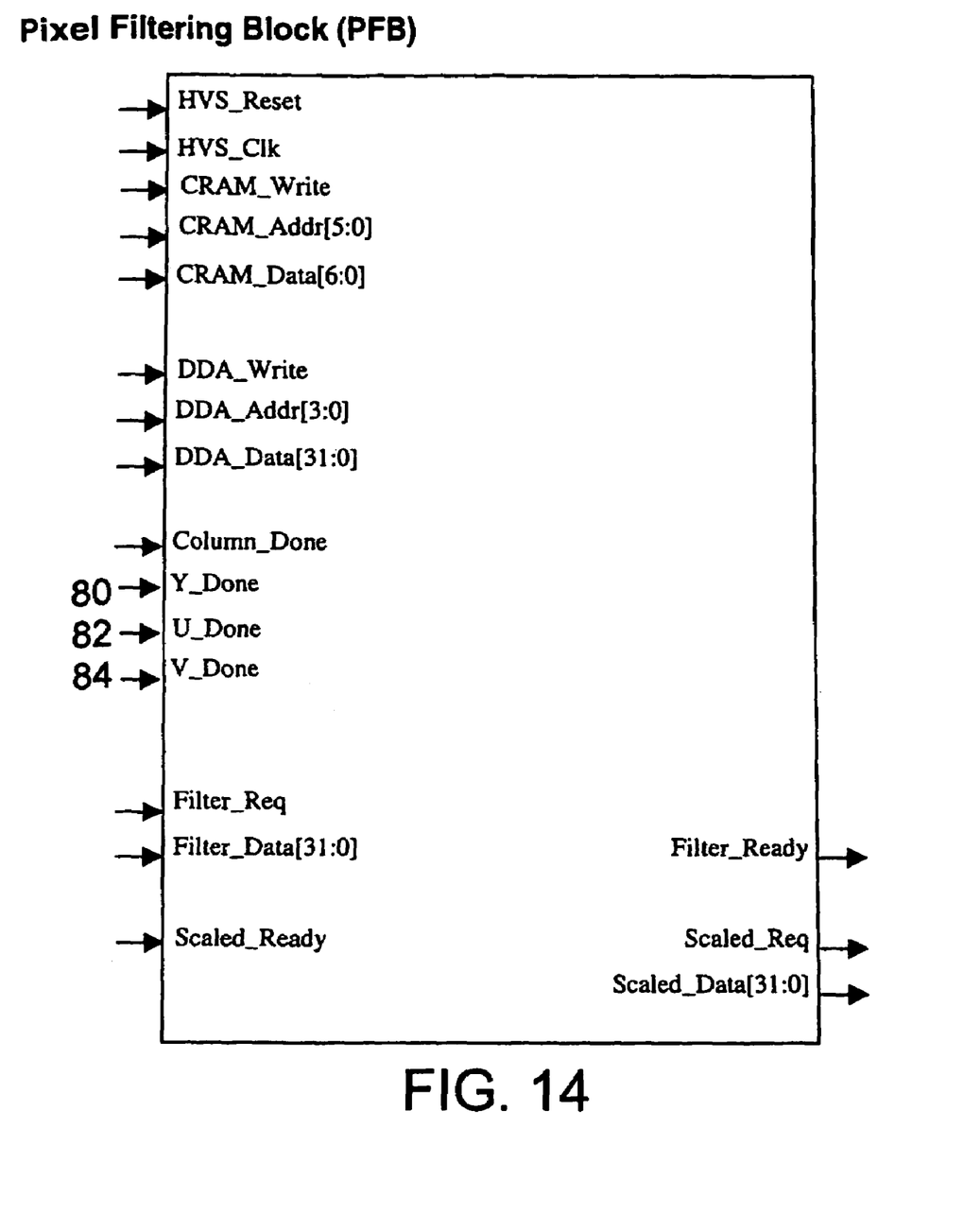
FIG. 14 is a diagram of input and output pins on a pixel filtering block.
Figure 15:
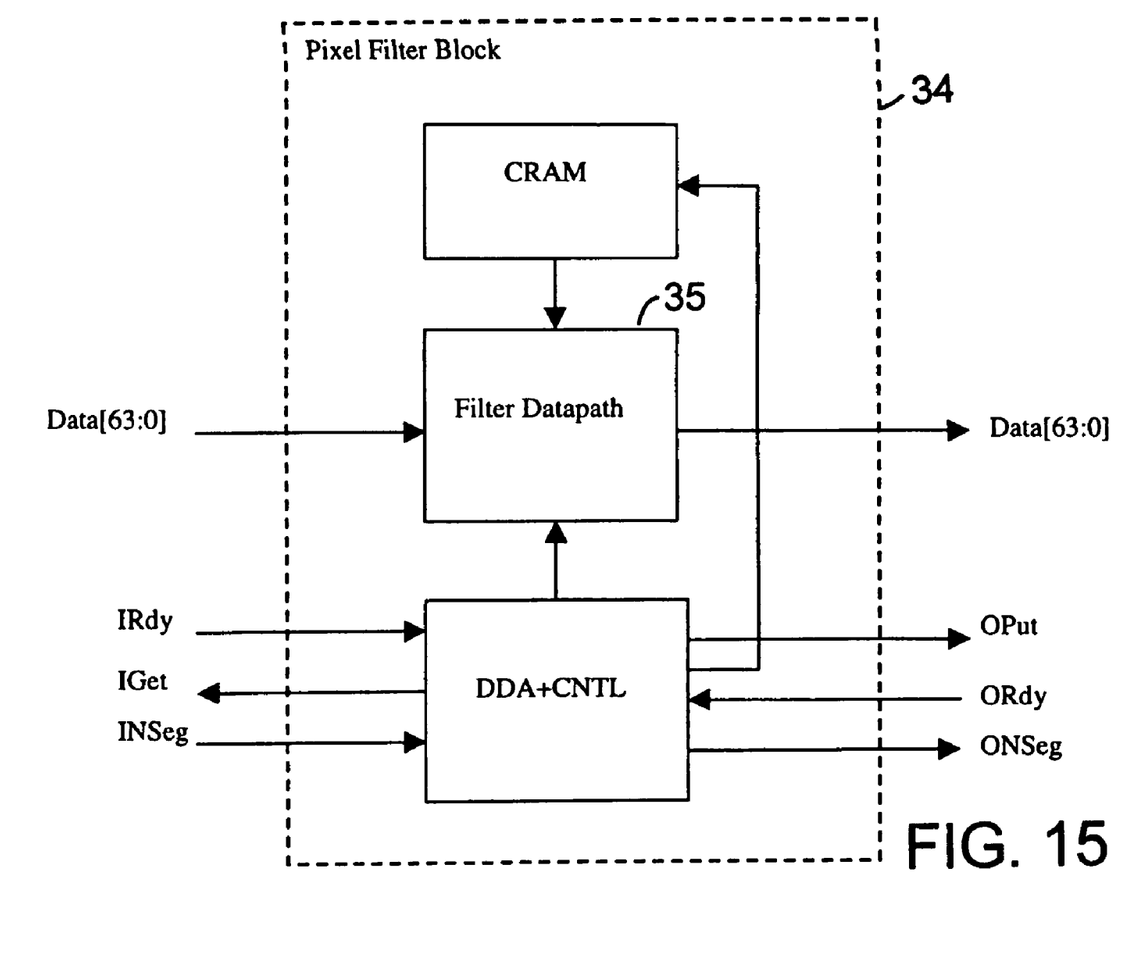
FIG. 15 is a block diagram of a pixel filtering block.

As shown in FIGS. 14 and 15, the PEB 34 starts its operations when it sees an Off to On transition, triggered by x_Done 74, on one of a Y_Done 80, U_Done 82, or V_Done 84 input. A filter datapath 35 in the PFB 34 fetches two horizontal pixel segments 25 (each segment has one quad of data) at a time from the IPEB 32. The horizontal pixel segments 25 are fetched from top to bottom, working from the left column to the right column. As the PEB 34 reads horizontal pixel segments 25, it filters them based on a scale factor. The PFB 34 can properly operate on both luminance and chrominance (subsampled) pixels. The PFB 34 outputs the number of filtered pixels to form the same sized pixel segment as the PFB received to an output formatting block (OPFB) 36.

Therefore, in general what the PFB 34 does is vertically scale pixel segments (each segment having four pixels for a 4:1 downscaling) of the original image 22 and output the scaled pixels to the OPFB 36.

The third block in the hardware vertical scaler 40 is the OPFB 36, implemented as an integrated circuit with inputs as shown in FIG. 16 and outputs as shown in FIG. 17.

Figure 18:
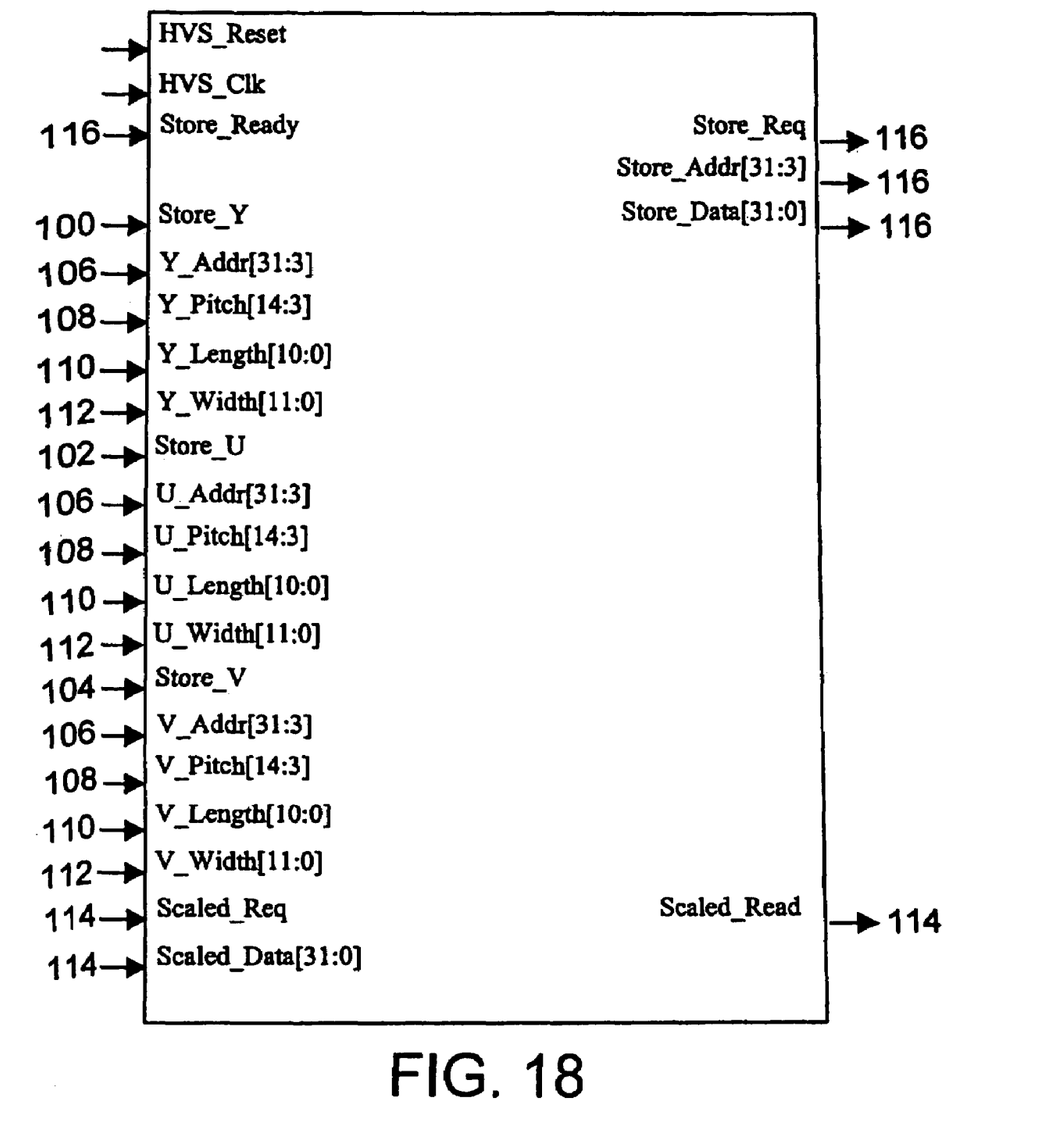
FIG. 18 is a diagram of input and output pins on an output pixel formatting block.

As shown in FIG. 18, the OPFB 36 starts its operations when it sees an Off to On transition, triggered by the Store_x 94 from the PFB 34, on a corresponding Store_Y 100, Store_U 102, or Store_V 104 input. The OPFB 36 uses scaled inputs and outputs 114 to handshake with the PFB 34 and receive the vertically scaled pixel segments to be rendered in memory interface 30. The OPFB 36 resets an x_Addr 106 (current address value) to point to the storage location for the first vertically scaled pixel segment 27 (see FIG. 6) it receives from the PFB 34. Since the PFB 34 does not perform any horizontal resizing, input image 22 and output image 24 have the same horizontal dimension, allowing for just one set of registers describing the image width and pitch values for the IPFB 32 and the OPFB 36.

The OPFB 36 buffers the vertically scaled pixel segments 27 in a first in, first out (FIFO) queue. From the FIFO queue, the OPFB 36 stores each vertically scaled pixel segment 27 in the memory interface 30, handshaking with the memory interface 30 using store inputs and outputs 116. The memory interface 30 stores the vertically scaled pixel segments 27 in memory 28.

Concurrent with buffering the pixel segment 27, the OPFB 36 adds the value at an x_Pitch 108, representing the size of the scaled pixel segment 27, to the appropriate x_Addr 106, indicating the address of the next vertically scaled pixel segment 27. Vertically scaled pixel segments 27 are so buffered until the value in an x_Length 110 is met, indicating the end of a column.

At the end of reading a column, during the transfer of the bottom vertically scaled pixel segment 27 (the flushing of the FIFO queue) to the memory interface 30, the OPFB 36 resets the x_Addr 106 to point to the top pixel segment 27 in the next column. The pixel buffering so continues until the value in an x_Width 112 is met, indicating that all columns have been buffered. At this point, the image has been vertically scaled and rendered to memory interface 30 by the hardware vertical scaler 40.

Therefore, in general what the OPFB 36 does is receive vertically scaled pixel segments from the PFB 34 and render them to memory interface 30.

Figure 19:
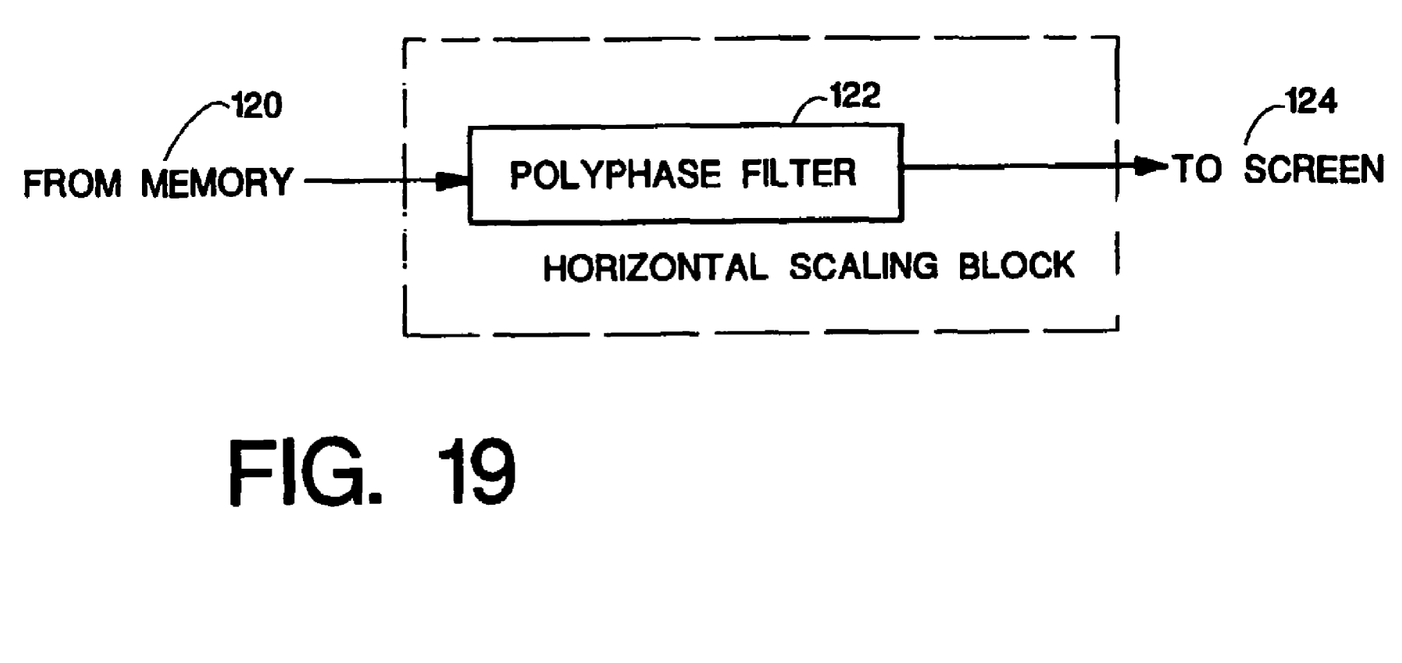
FIG. 19 is a block diagram of a horizontal scaling process.

Turning to the block diagram in FIG. 19, in a horizontal scaling process, a polyphase filter 122 reads the vertically scaled image 24 one horizontal pixel segment at a time from memory 120. The polyphase filter 122 horizontally scales each pixel segment as it receives it. The polyphase filter 126 reads four pixels of vertically scaled image 24 and compresses them to form one pixel of final image 26.

As shown in FIG. 6, and discussed above as overlay scaling, the pixels in vertically scaled image 24 are read four pixels (one horizontal pixel segment 27) at a time from top to bottom, working from the left column to the right column. The vertically and horizontally scaled image 26 replaces ("overlays") the previously scaled image 26 being displayed on the PC monitor 124. The number of images displayed per second at the PC CRT rate, e.g., 85 frames per second (85 Hz), enables a computer user to view a continuous video picture sequence on the monitor 124. The screen rate will repeat some images every second in order to approximate the slower image update rate, e.g., 60 frames per second (60 Hz).

Other embodiments are within the scope of the following claims.

What is claimed is:

1. A method, comprising:
    storing an entire higher definition television image in a memory;
    reading locations from the memory at an image update rate to fetch first pixels in the image, which are vertically contiguous in the image;
    vertically scaling the first pixels to produce in the memory a vertically scaled set of pixels representing scaling of the entire television image; and
    after said vertically scaling of the entire image, reading the vertically scaled set of pixels from the memory at an image display rate and horizontally scaling the vertically scaled set of pixels at the image display rate to form a final two-dimensional scaled image of a lower definition;
    wherein the image update rate is different from the image display rate.

2. The method of claim 1, further comprising:
    storing, reading, and scaling a sequence of images from said higher definition television images representing video sequence of images to said lower definition sequence of images; and
    displaying said lower definition sequence of images.

3. The method of claim 1 wherein said vertically scaling comprises reading X locations from a memory at an image update rate by reading a plurality of luminance planes in a pre-determined order.

4. The method of claim 1 in which the vertical scaling occurs at a rate that is smaller than a rate at which the horizontal scaling occurs.

5. An apparatus comprising:
    a memory operable to store a higher definition television image;
    a scaling element, configured to first fetch pixels of the higher definition television image at an image update rate and to vertically scale the higher definition pixels to produce a vertically scaled image of contiguous, vertically scaled, horizontal pixels in the memory and to read pixels of the vertically scaled image only after the entire vertically scaled image has been formed, at an image display rate and horizontally scale pixels of the vertically scaled image at the image display rate to form a lower definition image of pixel representing a final two-dimensional scaled image; and
    a computer monitor operable to display the final two-dimensional scaled image,
    wherein the image update rate is different from the image display rate.

6. The apparatus of claim 5 wherein the memory, and scaling element store, read, and scale a plurality of images in a high definition television video sequence of images.

7. The apparatus of claim 5 in which the scaling element comprises at least one integrated circuit.

8. The apparatus of claim 5 wherein the scaling element reads locations in the memory at an image update rate by reading a plurality of luminance planes in a pre-determined order.

9. The apparatus of claim 5 in which the vertical scaling occurs at a rate that is smaller than a rate at which the horizontal scaling occurs.

10. The apparatus of claim 5 wherein the memory comprises a memory interface, an input pixel formatting circuit, a pixel filtering circuit and an output pixel formatting circuit.

11. The apparatus of claim 10 in which the input pixel formatting circuit has three sets of luminance plane inputs.

12. The apparatus of claim 10 in which the pixel filtering circuit operates on both luminance and chrominance pixels, the pixel filtering circuit receiving and outputting horizontal pixel segments of a similar size.

13. The apparatus of claim 5 in which the scaling element includes a polyphase filter.

14. An article comprising a computer-readable medium which stores computer-executable instructions for scaling each high definition television image that appears in a video sequence of images for display on a computer monitor that displays downscaled images, the instructions causing a computer to:

store an entire higher definition television image in a memory;

read locations from the memory at an image update rate to fetch first pixels in the image, which are vertically contiguous in the image;

vertically scale the first pixels to produce in the memory a vertically scaled set of pixels representing scaling of the entire television image;

after said vertically scaling of the entire image, read the vertically scaled set of pixels from the memory at an image display rate and horizontally scale the vertically scaled set of pixels at the image display rate to form a final two-dimensional scaled image of a lower definition; and display the final two-dimensional scaled image;

wherein the image update rate is different from the image display rate.

* * * * *